(No Model.)  3 Sheets—Sheet 1.

W. BEERS.
MACHINE FOR TURNING CARRIAGE AXLES.

No. 267,480.  Patented Nov. 14, 1882.

(No Model.)  3 Sheets—Sheet 2.

W. BEERS.
MACHINE FOR TURNING CARRIAGE AXLES.

No. 267,480.  Patented Nov. 14, 1882.

Attest:
J. W. Howard
Jno. R. Young.

Inventor:
Wheeler Beers
by W. H. Doolittle
Attorney (No Model.) 3 Sheets—Sheet 3.

W. BEERS.
MACHINE FOR TURNING CARRIAGE AXLES.

No. 267,480. Patented Nov. 14, 1882.

Attest:
F. W. Howard
Jno. R. Young.

Inventor;
Wheeler Beers
by M. A. Doolittle
Attorney

UNITED STATES PATENT OFFICE.

WHEELER BEERS, OF BRIDGEPORT, CONNECTICUT.

MACHINE FOR TURNING CARRIAGE-AXLES.

SPECIFICATION forming part of Letters Patent No. 267,480, dated November 14, 1882.

Application filed April 14, 1882. (No model.)

*To all whom it may concern:*

Be it known that I, WHEELER BEERS, a citizen of the United States, residing at Bridgeport, in the county of Fairfield and State of Connecticut, have invented certain new and useful Improvements in Machines for Turning Carriage-Axles; and I do hereby declare the following to be a full, clear, and exact description of the invention, such as will enable others skilled in the art to which it appertains to make and use the same.

This invention has for its object the improvement of that class of machines for turning carriage-axles in which a hollow open mandrel is used, as particularly illustrated and described in Patent No. 197,999, granted to Coulter and McKenzie, December 11, 1877; and it consists of a new arrangement and combination of the gearing, mandrel, and chuck, of chuck and adjustable jaws, of adjustable tool-holder and back rest, and a new construction of some of these parts.

These improvements are illustrated in the accompanying drawings, in which—

Figure 1:
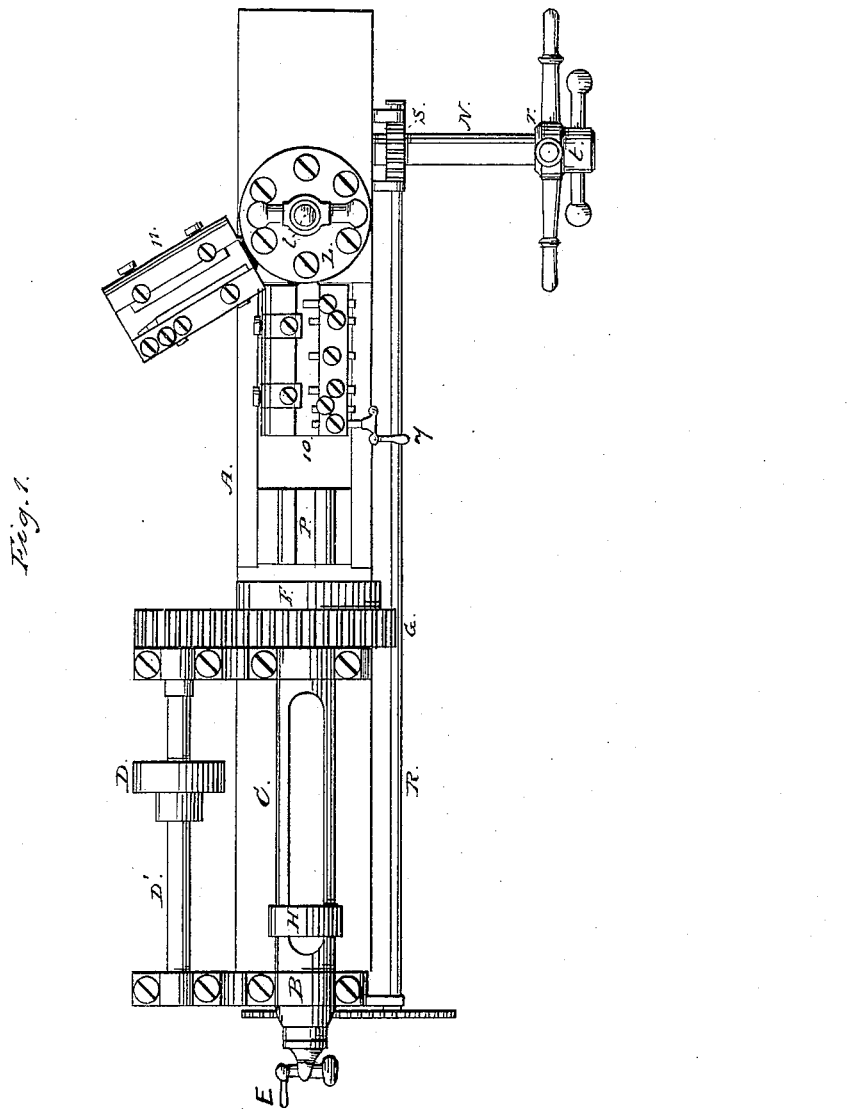
Figure 2:
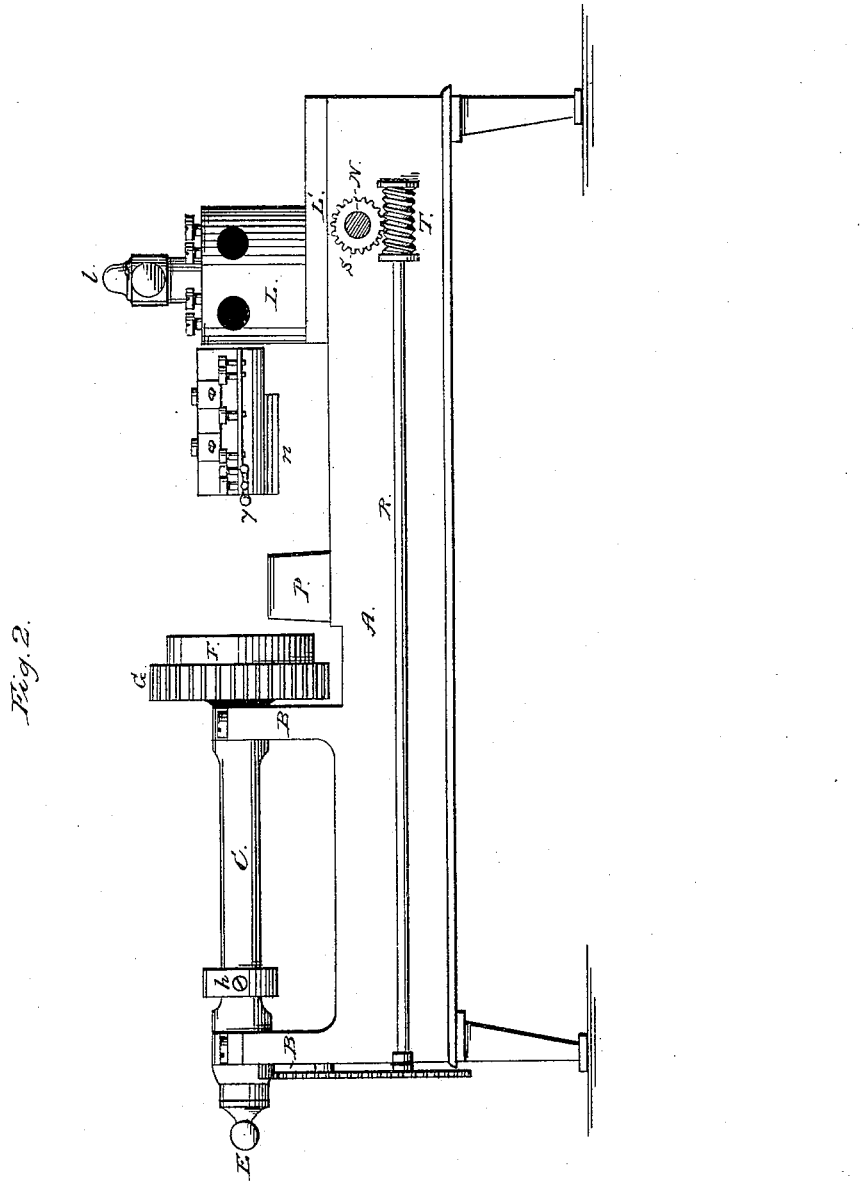
Figure 3:
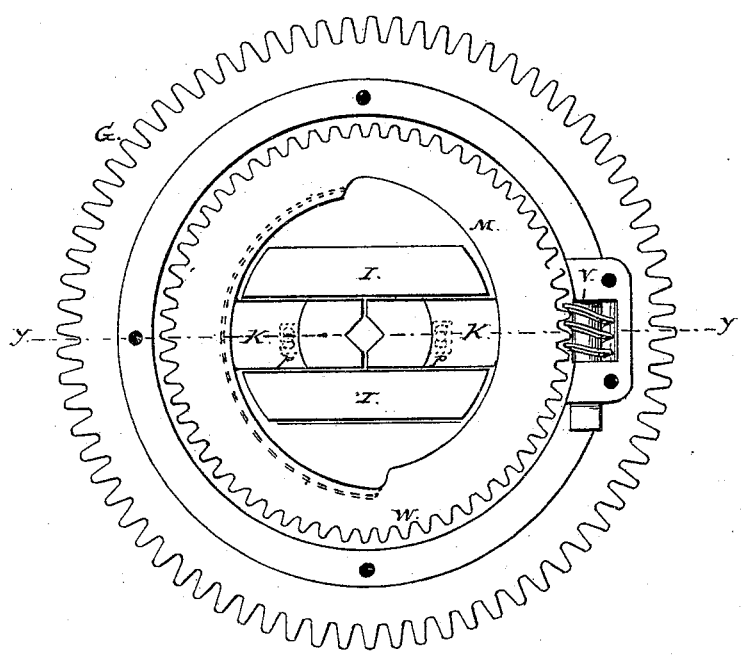
Figure 4:
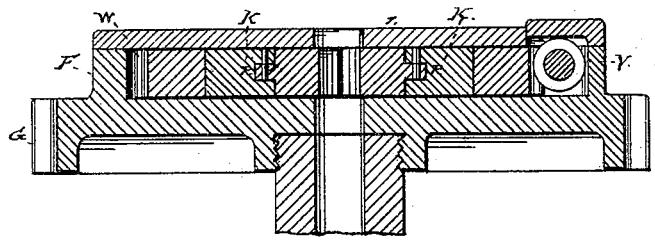

Figure 1 is a plan view; Fig. 2, a side view; Fig. 3, a view showing face of chuck with top plate, 1, removed, adjustable jaws, and operating mechanism; Fig. 4, a vertical section on line $y\,y$ of Fig. 3, and Fig 5 a detached view of the new form of back rest and cutter as used in a finishing-tool.

The same letters indicate similar parts throughout the several views.

A number of the parts herein set forth are the same in construction and operation as described in Patent No. 197,999. For instance, A is the bed, at one end of which, in suitable bearings, B B, a mandrel, C, is arranged. To the mandrel C power is applied to cause its revolution through a pulley, D, on a shaft, D', geared to the said mandrel. The mandrel is employed for the support of the axle, and is made hollow, and open in one or two sides, so as to allow the body of the axle to be introduced therein from the front end. Also, through the rear end of the mandrel a spindle is arranged, which is not shown here, its inner end terminating in a point or center, and at the other end is arranged a nut, threaded to correspond to a thread on the said spindle, and to this nut is attached a suitable handle, E, by which the center may be moved in or out to accommodate the varying lengths of the axles to be finished; also, a collar, H, is arranged to slide on the mandrel C and be set at any desired point for the purpose of centering shorter axles. The inner end of the centering-spindle is supported by said collar. Also, a rotating tool-holder, L, is arranged on a slide, L', which slide is given a longitudinal movement by means of shaft N, turning a pinion working in a rack in the said slide. (Not here shown.) As, too, in said patent, the holder L may be set at any point desired by means of a screw, $l$. The tools for finishing the axle are arranged around the holder (only two, 10 and 11, in present application are employed) so that either may be turned into axial line with the mandrel, as in said patent. A guide, P, is also arranged on the bed, having its upper surface grooved to receive a rib, $n$, formed in each of the tools, by which means an unvarying guide for the tool is obtained. As in said patent, the tools are fed automatically by means of a shaft, R, worm T, pinion S, and shaft N. A slow rotary motion is given shaft R by gears at the head of the machine, which is communicated through worm T to pinion S, and thus the requisite longitudinal movement is given to the slide on which the tool-holder rests, as above stated. So, too, is employed the combination of a hand-wheel, $r$, the shaft N, provided with a sleeve, and a nut, $t$, by which, when the nut is turned hard up, it forces the hand-wheel $r$ and sleeve on the shaft toward the pinion S, and so as to grasp it firmly and couple it with the shaft.

So far the features described are common with Patent No. 197,999.

The change I first make is to transfer the main driving-gear from its position at the rear end of the mandrel, as shown in said patent, to the head of the mandrel, directly behind the chuck.

G represents the gear referred to, and its new position is shown in Figs. 1 and 2. It is driven from that point by any suitable means, in combination with the mandrel and pulley D and shaft D', above described. The object of thus locating the gearing directly behind the chuck F is to remove practically all strain on the mandrel and centering-supports, and thus permit the turning by this form of machine of larger-sized axles.

F is the chuck, which is set in the face of the gear-wheel G. I provide the chuck with a new form of jaws to grasp the axle, and operate the said jaws by a cam mechanism instead of by a right-and-left threaded screw.

K K represent the jaws referred to. (Shown in Fig. 3.) Each jaw consists of two separate parts connected by center-pins, as indicated by $p\ p$, Fig. 3, turning loosely in holes or slots sufficiently large to obviate all binding. The faces of the respective parts at their junction are half-circular in form, the concave faces of the outer part constituting seats for the convex faces of the inner or clutch parts. Thus is formed a clutch having a true universal seat, by which the body of the axle is grasped and effectively held in any desired position for operation thereon by the tools.

I I are lugs cast on the face of the wheel W, to form guides for the jaws. The jaws K K are worked toward each other by means of cam M upon the inner face of the wheel W, which is operated by the worm V. The cam operates on the outer sides of both jaws to force them in. The jaws may be drawn out by a corresponding cam arranged for that purpose, or by a spring or springs, one end of a spring being attached to a jaw and the other end to the cam-plate. When two cams are used—one the external and the other the internal cam—the outer one may be provided with a groove in which a hook is placed, one end of which is attached to the upper jaw, as indicated in dotted lines in Fig. 1. In order to receive the axle, the jaws are first opened by a backward movement of the cam, and, when the axle is placed in the desired position, the cam is given a forward movement and the jaws are moved forward and hold the axle securely in place. Other means may be used for operating the jaws, but I prefer the cam mechanism, as it operates more quickly, surely, and effectively than a right and left hand screw.

Figure 5:
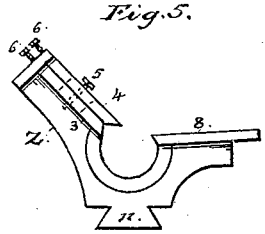

My further improvements on the machine set forth in Patent 197,999 relate to the tools for turning the back of the axle, for roughing and finishing the same, and to the form of back rest for holding the axle during those operations. The same turret form of tool-holder L is employed; but by my improvements the same operations on the axle are performed by one less tool and by one less rotation of the tool-holder. This new form of adjustable back rest and means for operating the same are illustrated in Figs. 1 and 5.

Instead of making the back rest of one piece, it is made in two parts, 3 and 4, connected by a screw-bolt, 5, or other suitable means, and thus each part is made independently adjustable. When a screw-bolt is used it is passed down through a slot in both parts or jaws, and into a female screw in the plate beneath. The slot permits the jaws 3 and 4 to be moved backward or forward to adjust them to the axle before they are secured in place. Screws 6 6 are also employed to adjust the jaws 3 4 in proper position on the stock Z. In Fig. 5 the back rest is shown as placed when the tool is used for finishing. In roughing the rests are separated, longitudinally along the axle, as shown in Fig. 1, so as to leave the center of the axle free, and thus prevent cramping or binding the same, and the tool is properly grooved to receive the respective rests at the angle desired.

It is evident that the back rest may consist of more than two parts, for greater security in holding the axle, and the same arrangement employed for connecting the additional rests to the stock.

The cutter 8 is the same in form and operation as described in the patent mentioned, and an adjustable screw, 7, the same in form as is also shown in said patent, is employed to move inward and outward the said cutter.

The cutter and back rests described are adapted to be used with either the roughing and finishing tools 10 and 11, as shown in Fig. 1, in conjunction with the adjusting-screw 7, and the use of a third form of tool—such as 3 in said patent—may be dispensed with.

In place of the adjusting-screw for operating the cutter, any suitable form of lever may be used.

The chief advantage of this my present form of back rest is that, while thoroughly efficient means are provided for supporting the axle against the pressure of the cutter, free access to and sight of nearly all of the back of the axle during the processes of roughing and finishing are obtained; and especially is this advantage had in finishing the axle, as then, instead of using two rests separated at some distance from each other in a stock which surrounds one-half or more of the axle, the two parts constituting the rest are brought together, and thus the surrounding stock is much reduced in circumference.

Having thus described my invention, what I claim, and desire to secure by Letters Patent, is—

1. In a machine for turning carriage-axles, the combination of the hollow open mandrel, the chuck, and the main gear G, said gear being arranged on the forward end of the said mandrel and directly behind the chuck, whereby all strain on the mandrel and centering-supports is practically removed, substantially as described.

2. In a machine for turning carriage-axles, the chuck F and the jaws K K, each of the said jaws consisting of two parts connected by loosely-turning center-pins, and having respectively the half-circular faces, in combination with suitable mechanism for operating the same, as and for the purpose substantially as described.

3. In a machine for turning carriage-axles, the adjustable roughing and finishing cutter, in combination with the back rest composed of the independently-adjustable parts, and arranged as described, whereby free access to and sight of the back of the axle are obtained, substantially as and for the purpose set forth.

4. The back rest consisting of the two jaws or sections 3 and 4, in combination with the cutter 8, for turning the collar of the axle, and the adjusting-screw 7, substantially as described.

In testimony whereof I affix my signature in presence of two witnesses.

WHEELER BEERS.

Witnesses:
DAVID B. LOCKWOOD,
ALFRED B. BEERS.